US012576366B2

(12) United States Patent
Baku et al.

(10) Patent No.: US 12,576,366 B2
(45) Date of Patent: Mar. 17, 2026

(54) PPO BASED FILM WITH HIGH SURFACE AREA AND PROCEDURES FOR THE OBTAINMENT THEREOF

(71) Applicant: MATERIAS S.r.l., Naples (IT)

(72) Inventors: Nagendra Baku, Anantapur (IN); Christophe Daniel, Fisciano (IT); Paola Rizzo, Naples (IT); Gaetano Guerra, Salerno (IT)

(73) Assignee: MATERIAS S.r.l., Naples (IT)

( * ) Notice: Subject to any disclaimer, the term of this patent is extended or adjusted under 35 U.S.C. 154(b) by 435 days.

(21) Appl. No.: 18/253,304

(22) PCT Filed: Nov. 17, 2021

(86) PCT No.: PCT/IB2021/060662
§ 371 (c)(1),
(2) Date: May 17, 2023

(87) PCT Pub. No.: WO2022/107022
PCT Pub. Date: May 7, 2022

(65) Prior Publication Data
US 2024/0017241 A1 Jan. 18, 2024

(30) Foreign Application Priority Data
Nov. 18, 2020 (IT) ........................ 102020000027660

(51) Int. Cl.
| | |
|---|---|
| *B01D 67/00* | (2006.01) |
| *B01D 53/22* | (2006.01) |
| *B01D 69/02* | (2006.01) |
| *B01D 69/10* | (2006.01) |
| *B01D 71/52* | (2006.01) |
(Continued)

(52) U.S. Cl.
CPC ..... *B01D 67/00091* (2022.08); *B01D 53/228* (2013.01); *B01D 67/0013* (2013.01); *B01D 67/002* (2013.01); *B01D 69/02* (2013.01); *B01D 69/107* (2022.08); *B01D 69/108* (2022.08); *B01D 71/5223* (2022.08); *B01J 20/265* (2013.01); *B01J 20/28033* (2013.01); *B01J 20/28061* (2013.01); *B01J 20/3007* (2013.01); *B01J 20/3425* (2013.01); *B01J 20/3475* (2013.01); *C08G 65/44* (2013.01);
(Continued)

(58) Field of Classification Search
CPC ............ B01D 67/00091; B01D 69/107; B01D 69/108; B01D 71/5223; B01D 53/228; B01D 67/0013; B01D 67/002; B01D 69/02; B01D 2325/04; B01J 20/265; B01J 20/28033; B01J 20/28061; B01J 20/3007; B01J 20/3425; B01J 20/3475; C08G 65/44; C08J 5/18; C08J 2371/12
USPC ........................................................ 502/402
See application file for complete search history.

(56) References Cited

U.S. PATENT DOCUMENTS

2013/0280534 A1 10/2013 Albunia et al.

OTHER PUBLICATIONS

Rizzo et al., Polymer, 167 (2019) 193-203 (Year: 2019).*
(Continued)

*Primary Examiner* — James E Mcdonough
(74) *Attorney, Agent, or Firm* — Oblon, McClelland, Maier & Neustadt, L.L.P.

(57) ABSTRACT

The object of the present invention is polyphenylene oxide based film with crystalline nanoporous phases with surface area equal to or greater than 30 m2/g, preferably greater than 100 m2/g, and a procedure for the attainment thereof.

20 Claims, 3 Drawing Sheets

(51) Int. Cl.

| | |
|---|---|
| *B01J 20/26* | (2006.01) |
| *B01J 20/28* | (2006.01) |
| *B01J 20/30* | (2006.01) |
| *B01J 20/34* | (2006.01) |
| *C08G 65/44* | (2006.01) |
| *C08G 65/48* | (2006.01) |
| *C08J 5/18* | (2006.01) |

(52) U.S. Cl.

CPC .............. *C08G 65/485* (2013.01); *C08J 5/18* (2013.01); *B01D 2325/04* (2013.01); *C08J 2371/12* (2013.01)

(56) References Cited

OTHER PUBLICATIONS

International Search Report & Written Opinion mailed on Feb. 18, 2022 in PCT/IB2021/060662 filed on Nov. 17, 2021 (8 pages).

Rizzo Paola et al: "Nanoporous-crystalline films of PPO with parallel and perpendicular polymer chain orientations", Polymer, vol. 167, Jan. 29, 2019 (Jan. 29, 2019), pp. 193-201.
Gaetano Guerra et al: "Advanced materials based on polymer cocrystalline forms", Journal of Polymer Science Part B: Polymer Physics, vol. 50, No. 5, Mar. 1, 2012 (Mar. 1, 2012), pp. 305-322.
Nagendra, B., et al: "Two Nanoporous Crystalline Forms of Poly(2,6-dimethyl-1,4-phenylene)oxide and Related Co-Crystalline Forms", Macromolecules 2019, vol. 52, No. 24, pp. 9646-9656.
Daniel, C., et al: "Nanoporous Crystalline Phases of Poly(2,6-Dimethyl-1,4-phenylene)oxide", Chemistry of Materials, vol. 23, Jul. 12, 2011 (Jul. 12, 2011) pp. 3195-3200.
Daniel, C., et al: "Syndiotactic Polystyrene Aerogels: Adsorption in Amorphous Pores and Absorption in Crystalline Nanocavities", Chem. Matter., vol. 20, No. 12, 2008, pp. 577-582.
Guerra, G., et al: "Advanced Materials Based on Polymer Cocrystalline Forms", Journal of Polymer Science Part B: Polymer Physics , 2012, vol. 50, 19 total pages.
Daniel, C., et al: "Nanoporous-crystalline poly(2,6-dimethyl-1,4-phenylene)oxide (PPO) aerogels", Polymer, vol. 105, Nov. 22, 2016, pp. 96-103.

* cited by examiner

PPO BASED FILM WITH HIGH SURFACE AREA AND PROCEDURES FOR THE OBTAINMENT THEREOF

FIELD OF THE INVENTION

The present invention regards PPO based films with high surface area and a procedure for the attainment thereof.

In particular, the PPO film has a surface area equal to or greater than 30 m²/g. More particularly, the procedure comprises the absorption/desorption of host molecules (guests) by an amorphous PPO film with particular conditions of crystallization kinetics induced by the guest.

STATE OF THE ART

Crystalline nanoporous phases are characterized by the presence of molecular-size cavities, which can be used for hosting and possibly releasing host molecules with low molecular mass.

Crystalline nanoporous phases are well-known for two commercial polymers, syndiotactic polystyrene and poly(2, 6-dimethyl-1,4-phenylene)oxide (commonly known as polyphenylene oxide or by means of the acronym PPO).

In the scientific literature article Nagendra, B.; Cozzolino, A.; Daniel, C.; Rizzo, P.; Guerra, G.; Auriemma, F.; De Rosa, C.; D'Alterio, M. C.; Tarallo, O.; Nuzzo, A. "Two Nanoporous Crystalline Forms of Poly(2,6-dimethyl-1,4-phenylene)oxide and Related Co-Crystalline Forms", *Macromolecules* 2019, 52, 9646-9656 it is described that the PPO comprises two crystalline nanoporous forms, respectively termed form α and form β, easily recognizable by applying the WAXD (wide-angle X-ray diffraction) and FTIR (Fourier transform infrared) techniques).

Such crystalline nanoporous phases are obtained starting from co-crystalline phases, i.e. from crystalline phases which contain host polymer chains and guest molecules with low molecular mass. The obtainment of crystalline nanoporous phases occurs following the removal of the host molecules from co-crystalline phases, with suitable techniques, such as for example shown in the patent US2013280534 or in the scientific literature article Guerra, G.; Daniel, C.; Rizzo, P.; Tarallo, O., "Advanced materials based on polymer cocrystalline forms", *J. Polym. Sci., Part B: Polym. Phys.* 2012, 50, 305-322.

Such crystalline phases are characterized by the presence of molecular-size cavities, which can be used for hosting and possibly releasing guest molecules with low molecular mass.

It is also well-known that also the PPO amorphous phase is nanoporous, since it is also capable of absorbing great quantities of guest molecules even if, generally, in lower quantities than the crystalline nanoporous phases, as shown for example in the scientific literature article Daniel, C.; Longo, S.; Fasano, G.; Vitillo, J. G.; Guerra, G., "Nanoporous Crystalline Phases of Poly(2,6-Dimethyl-1,4-phenylene)oxide", *Chem. Mater.* 2011, 23, 3195-3200.

Specimens of PPO with crystalline nanoporous phases, if produced in the form of powders and aerogel, can have surface areas even greater than 500 m²/g (evaluated by means of the BET method) and consequently have high kinetics of absorption of guest molecules, as shown in the scientific literature article Daniel, C.; Pellegrino, M.; Venditto, V.; Aurucci, S.; Guerra, G., "Nanoporous-crystalline poly(2,6-dimethyl-1,4-phenylene)oxide (PPO) aerogels", *Polymer* 2016, 105, 96-103.

Nevertheless, the powders are easy to handle for many applications while the aerogels have a very low density, typically lower than 0.1 g/cm³, and therefore they have low absorption of guest molecules per volume unit.

For many devices for molecular separation, nanofiltration as well as for molecular sensors it is often suitable to use films which can be easily handled and have density close to 1 g/cm³.

Nevertheless, it is well-known that in the case of films, diffusiveness of the guest molecules is generally observed that is reduced by various orders of magnitudes, with respect to those of aerogels (as described for example in the work Daniel, C.; Sannino, D.; Guerra, G. Syndiotactic Polystyrene Aerogels: Adsorption in Amorphous Pores and Absorption in Crystalline Nanocavities. *Chemistry of Materials* 2008, 20, 577-582).

In the case of PPO film, the surface area is generally negligible, i.e. below the sensitivity of the BET method (generally 4 m²/g). It is also well-known that for syndiotactic polystyrene, i.e. the other polymer which has crystalline nanoporous forms, the surface areas of the films are always smaller than 4 m²/g.

SUMMARY OF THE INVENTION

The Applicant has surprisingly observed that by carrying out the operations of absorption and desorption of host molecules on amorphous PPO film in particular conditions, it was possible to obtain PPO films with high surface area.

In particular, the Applicant has observed that the surface area of the resulting PPO film was considerably increased when the step of absorption of the host molecule with formation of co-crystalline phases is conducted with a crystallization rate equal to or greater than 0.5 percentage points per minute up to reaching a percentage of crystallinity higher than 10%, preferably higher than 20%, by absorption of a quantity of host molecules equal to or higher than 20% w/w, preferably higher than 30% w/w. At the same time, the Applicant has observed that the surface area of the resulting PPO film was considerably increased when the total removal of the host molecules absorbed during the step of absorption was carried out before the verification of a partial desorption, in particular before the content of said host molecules had fallen below 20% w/w.

Therefore, a first aspect of the present invention is represented by a procedure for preparing a polyphenylene oxide (PPO) film with crystalline nanoporous phases, comprising the following steps:

preparation of an amorphous PPO film,
formation of co-crystalline phases with a percentage of crystallinity higher than 10% by absorption of host molecules,
formation of crystalline nanoporous phases by total removal of said host molecules,
characterized in that
said absorption of host molecules is conducted up to a host molecule content equal to or higher than 20% w/w,
said formation of co-crystalline phases occurs with a crystallization rate equal to or greater than 0.5 percentage points per minute, and
said total removal of said host molecules occurs before the content of said host molecules has dropped below 20% w/w.

In a first embodiment of the first aspect of the present invention said host molecules have a molecular volume greater than 0.25 nm³.

3

In a second embodiment of the first aspect of the present invention said host molecules are molecules of organic compounds, preferably selected from the group that comprises or consists of carvone, limonene, dibenzyl ether, eugenol, carvacrol, methyl benzoate and mixtures thereof.

In a third embodiment of the first aspect of the present invention, said step of formation of co-crystalline phases takes place at a temperature equal to or greater than 20° C.

In a fourth embodiment of the first aspect of the present invention, said preparation of an amorphous PPO film is carried out by melt casting and subsequent cooling or by solution casting and subsequent evaporation of the solvent.

In a fifth embodiment of the first aspect of the present invention, said amorphous PPO film is a self-supporting film or a coating of a substrate.

In a sixth embodiment of the first aspect of the present invention, said total removal of said host molecules occurs by absorption followed by desorption of host molecules of a volatile liquid compound.

In a seventh embodiment of the first aspect of the present invention, said total removal of said host molecules takes place by supercritical $CO_2$ extraction.

In an eighth embodiment of the first aspect of the present invention, said total removal of said host molecules occurs before the content of said host molecules has dropped below 30% w/w, preferably below 40% w/w, more preferably below 50% w/w, and still more preferably below 60% w/w.

In addition, a second aspect of the present invention is represented by a polyphenylene oxide (PPO) film with surface area equal to or greater than 30 $m^2$/g. In a first embodiment of the second aspect of the present invention, said crystalline nanoporous phases have a percentage of crystallinity higher than 20%, preferably higher than 30%, more preferably higher than 50%.

In a second embodiment of the second aspect of the present invention, said polyphenylene oxide film is a self-supporting film or a coating of a substrate.

In a third embodiment of the second aspect of the present invention, said substrate is made with a material selected from the group that comprises polymers, ceramics, glass, graphite, quartz, silicon and mixtures thereof.

In a fourth embodiment of the second aspect of the present invention, said crystalline nanoporous phases comprised in the PPO film are in alpha form.

In a fifth embodiment of the second aspect of the present invention, said polyphenylene oxide (PPO) film has a surface area equal to or greater than 100 $m^2$/g.

In a sixth embodiment of the second aspect of the present invention, said polyphenylene oxide (PPO) film has a thickness equal to or greater than 1 μm, thickness equal to or greater than 5 μm, preferably equal to or greater than 10 μm.

BRIEF DESCRIPTION OF THE FIGURES

FIG. 3 shows a Cartesian diagram with the isotherms of perchloroethylene (PCE) absorption at 35° C. and W/W°≤0.05 by PPO films with thickness of about 20 μm (a, b, d) and by a PPO aerogel with porosity equal to about 90% (c) as described in example 1.

Figure 4:
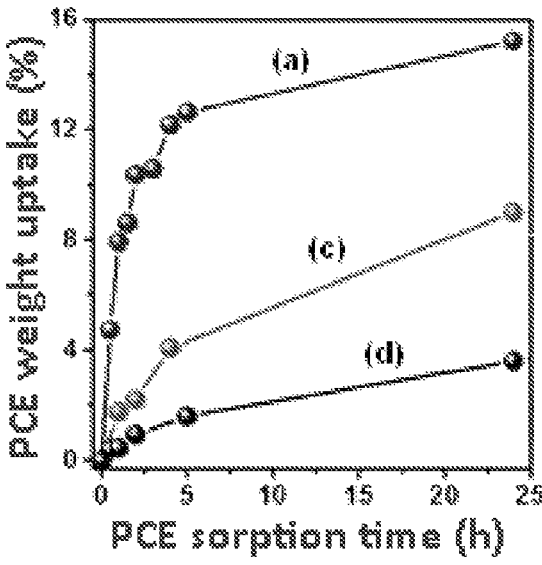

FIG. 4 shows a Cartesian diagram with the isotherms of PCE absorption by aqueous solutions with PCE concentration equal to 50 ppm at room temperature by PPO films with thickness of about 20 μm (a, d) and by a PPO aerogel with porosity equal to about 90% (c) as described in example 1.

Figure 5:
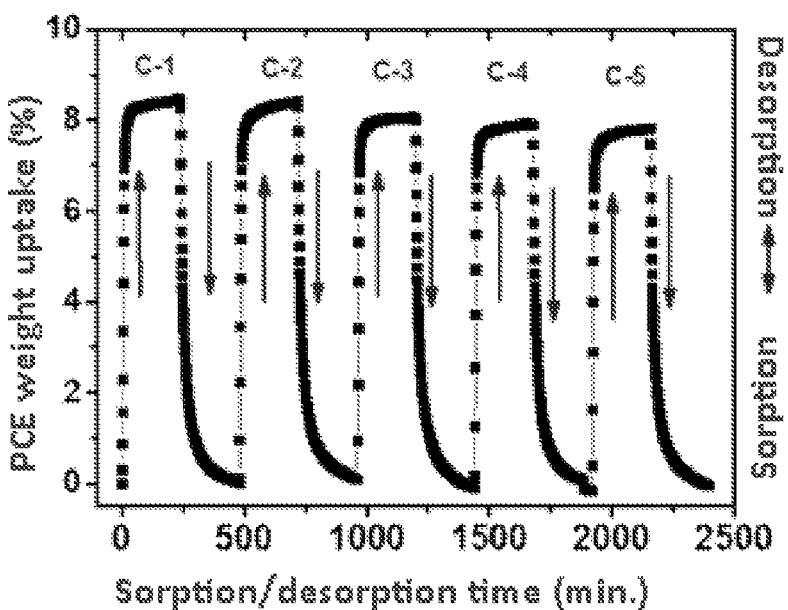

FIG. 5 shows a Cartesian diagram with five cycles of PCE absorption/desorption at 35° C. and W/W°=0.01 by PPO films with thickness of about 20 μm (a) as described in example 4.

DETAILED DESCRIPTION OF THE INVENTION

The present invention relates to a procedure for preparing a polyphenylene oxide (PPO) film with crystalline nanoporous phases, comprising the following steps:
preparation of an amorphous PPO film,
formation of co-crystalline phases with a percentage of crystallinity higher than 10% by absorption of host molecules,
formation of crystalline nanoporous phases by total removal of said host molecules,
characterized in that
said absorption of host molecules is conducted up to a host molecule content equal to or higher than 20% w/w,
said formation of co-crystalline phases occurs with a crystallization rate equal to or greater than 0.5 percentage points per minute, and
said total removal of said host molecules occurs before the content of said host molecules has dropped below 20% w/w.

The first step of the procedure of the present invention provides for the preparation of an amorphous PPO film.

The preparation of an amorphous PPO film is carried out by means of melt casting and subsequent cooling or by solution casting and subsequent evaporation of the solvent.

The casting can be attained as coating deposited on a suitable substrate, such as for example a substrate made with a material selected from the group that comprises ceramics, glass, graphite, quartz, silicon, polymers, such as for example ethylene polymers and copolymers, propylene polymers and copolymers, lactic acid polymers, polyamides, and mixtures thereof.

Any melt casting procedure leads to the formation of an amorphous PPO film, while the obtainment of amorphous PPO films by solution casting requires a suitable selection of the solvent, of the concentration and of the procedure temperature. The solvent is preferably selected from the group that comprises or consists of organic solvents, such as for example chloroform, dichloromethane, tetrachloromethane, dichloroethane, trichloroethane, trichloroethylene, benzene, o-dichlorobenzene, trichlorobenzene, toluene and methyl benzoate. The concentration of the PPO in the solvent are preferably selected in the interval from 1% to 10%, preferably from 1% to 5% by weight with respect to the weight of the resulting solution. The temperature of evaporation of the solvent is preferably higher than the room temperature, preferably higher than 60° C.

The second step of the procedure of the present invention provides for the formation of co-crystalline phases by absorption of host molecules, preferably molecules of an organic compound.

The host molecules preferably have a molecular volume greater than 0.20 $nm^3$, more preferably greater than 0.25 $nm^3$.

The molecular volume of the host molecule can be calculated by means of the following equation:

$$V = M/\delta N_A$$

where M and δ are respectively the molecular mass and the density of the host molecule, and $N_A$ is the Avogadro's number ($6.022 \times 10^{23}$).

The absorption of the host molecules can be carried out via immersion in a liquid or via vapor exposure, preferably via immersion in a liquid. The liquid can be constituted by the pure organic compound or by a solution thereof in inert solvent, i.e. unable to be absorbed.

The absorption of the host molecules can be carried out up to a host molecule content equal to or higher than 20% w/w, preferably equal to or higher than 30% w/w, more preferably equal to or higher than 40% w/w, and still more preferably equal to or higher than 50% w/w.

Advantageously, the absorption of the host molecules can be carried out up to a host molecule content comprised between 50% and 90% w/w, in particular between 65% and 80% w/w, ends included.

The formation of co-crystalline phases preferably occurs with a crystallization rate equal to or greater than 1 percentage point per minute, more preferably equal to or greater than 2 percentage points per minute, and still more preferably equal to or greater than 3 percentage points per minute.

The crystallization rate can be controlled by varying the temperature and/or by using suitable organic compounds or mixtures thereof, and/or by varying the physical state of the guest (liquid, vapor, gas).

Advantageously, the step of absorption takes place at a temperature equal to or greater than 20° C., preferably equal to or greater than 30° C., more preferably equal to or greater than 50° C.

Preferably, the organic compounds used are carvone, limonene, dibenzyl ether, eugenol, carvacrol, methyl benzoate, mixtures thereof and their solutions in inert solvents.

The third step of the procedure of the present invention provides for the transformation of the co-crystalline phases in crystalline nanoporous phases, by total removal of the host molecules.

With the expression "total removal of the host molecules" it is intended the reduction of the concentration of the host molecules to a percentage at least equal to or lower than 0.1% w/w, preferably equal to or lower than 0.05% w/w.

The total removal of the host molecules can be carried out by means of absorption followed by desorption of host molecules of a volatile liquid compound, or by means of supercritical $CO_2$ extraction.

The absorption/desorption procedure which uses a volatile liquid compound is preferably conducted at temperatures comprised between 0° C. and 80° C., more preferably between 10° C. and 50° C. Preferably, the volatile liquid useful in the present invention is selected from the group that comprises or consists of acetonitrile, acetone, methyl ethyl ketone and methanol.

Advantageously, the extraction procedure which uses supercritical $CO_2$ is conducted under pressure, preferably at values comprised between 50 and 350 bar, more preferably between 150 and 250 bar, at a temperature equal to or higher than the room temperature, preferably at values comprised between 20° C. and 70° C., more preferably between 25° and 60° C., in a time period comprised between 30 and 500 minutes, preferably between 60 and 300 minutes.

The Applicant has observed that the removal of the host molecules also occurs spontaneously, i.e. via separation and detachment of the host molecules from the co-crystalline structure caused by the simple exposure to environmental conditions.

The Applicant has also observed that the resulting surface area depends on the quantity of residual host molecules present in the co-crystalline phases before the total removal of the host molecules.

In particular, the Applicant has observed that the total removal of the host molecules must be carried out before the content of the same host molecules has dropped below 20% w/w.

Preferably, the total removal of the host molecules must be carried out before the content of the same host molecules has dropped below 30% w/w, preferably below 40% w/w, more preferably below 50% w/w, and still more preferably below 60% w/w. Advantageously, the total removal of the host molecules must be carried out before the content of the same host molecules has dropped below a value comprised between 60% and 80% w/w.

The total removal of the host molecules can be carried out in one or more steps.

The total removal can be conducted in multiple steps, as long as the last step starts from a host molecule content higher than 20% w/w, preferably higher than 30% w/w, more preferably higher than 40% w/w. Preferably, the total removal of the host molecules is carried out in a single step. The Applicant has in fact observed that the total removal of the host molecules in a single step allows obtaining, the other conditions being the same, a higher surface area.

The polyphenylene oxide (PPO) film with surface area equal to or greater than 30 $m^2$/g of the present invention can be in the form of self-supporting film or coating of a substrate.

The crystalline nanoporous phases comprised in the PPO film can be the alpha form (α) and/or the beta form (β) identified and described in the scientific literature article Nagendra, B.; Cozzolino, A.; Daniel, C.; Rizzo, P.; Guerra, G.; Auriemma, F.; De Rosa, C.; D'Alterio, M. C.; Tarallo, O.; Nuzzo, A. "Two Nanoporous Crystalline Forms of Poly(2,6-dimethyl-1,4-phenylene)oxide and Related Co-Crystalline Forms", *Macromolecules* 2019, 52, 9646-9656.

Preferably, the crystalline nanoporous phases comprised in the PPO film are in alpha form.

The polyphenylene oxide (PPO) film of the present invention can have a surface area equal to or greater than 100 $m^2$/g, preferably equal to or greater than 200 $m^2$/g, more preferably equal to or greater than 300 $m^2$/g, and still more preferably equal to or greater than 400 $m^2$/g.

Advantageously, the polyphenylene oxide (PPO) film of the present invention has a surface area comprised between 450 $m^2$/g and 800 $m^2$/g, in particular between 500 $m^2$/g and 650 $m^2$/g.

The percentage of crystallinity of the crystalline nanoporous phases of the PPO film of the present invention is preferably equal to or higher than 20%, more preferably higher than 30%, and still more preferably higher than 50%.

The percentage of crystallinity per PPO film is measured by means of differential colorimeter measurements (DSC), by evaluating the enthalpy of fusion of the specimen and assuming that the enthalpy of fusion of a completely crystalline specimen is equal to 43 J/g.

The thickness of the polyphenylene oxide (PPO) film with surface area equal to or greater than 30 $m^2$/g of the present invention is not particularly limited. Preferably, the polyphenylene oxide (PPO) film of the present invention has a thickness equal to or greater than 1 μm, preferably equal to or greater than 5 µm, more preferably equal to or greater than 10 µm, and still more preferably equal to or greater than 20 µm. Advantageously, the polyphenylene oxide (PPO) film of the present invention has a thickness comprised between 10 and 200 µm, in particular from 20 to 100 µm, ends included.

The polyphenylene oxide (PPO) film with surface area equal to or greater than 30 m$^2$/g of the present invention is adapted to be used for various applications, for example in membrane for molecular separation, preferably with gas, molecular sensors, preferably of optical nature, and in filters, and more generally in systems, multiple for the removal of organic pollutants from the air and from the water.

The present invention will now be illustrated with reference to materials and methods described as a non-limiting example in the following experimental part.

EXPERIMENTAL PART

Example 1

A first PPO film (Film a) with thickness of 20 µm and alpha crystalline nanoporous phase was obtained by means of a three-step procedure:

Step 1. Deposition of an amorphous PPO film (Film d) on a glass substrate by means of casting process at 60° C., from a chloroform solution with a concentration of PPO equal to 1% by weight.

Step 2. Crystallization in co-crystalline phase by means of immersion in liquid carvone at room temperature per 8 minutes, reaching a carvone content of about 80% by weight.

Step 3. Total extraction of the carvone by means of carbon dioxide in supercritical conditions (T=40° C., P=250 bar).

A second PPO film (Film b) with thickness of 20 µm with alpha crystalline nanoporous phase was obtained with the same procedure, except for step 3, substituted with the following step 3'.

Step 3'. Total extraction of the carvone by absorption/desorption of acetonitrile at room temperature.

The X-ray diffraction figures of such films have shown the presence of the diffraction peaks at 2θ=4.5°, 7.1°, 9.0°, 11.3°, 15.1°, indicating the presence of the alpha crystalline nanoporous form. Differential colorimeter scans have shown an enthalpy of fusion for the two films close to 20 J/g, corresponding to a crystallinity of about 46%. The measurement of the crystallization rate detected a rate higher than 5 percentage points of crystallization per minute.

Figure 1:
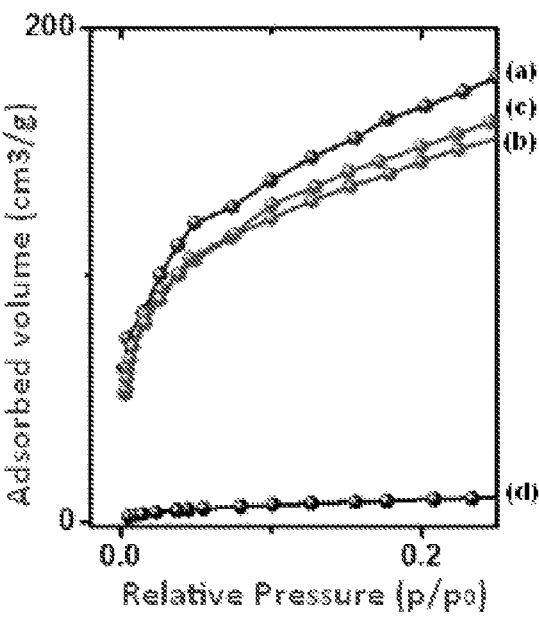
FIG. 1 shows a Cartesian diagram with the isotherms of nitrogen absorption at 77K by PPO films with thickness of about 20 μm (a, b, d) and by a PPO aerogel with porosity equal to about 90% (c) as described in example 1.

The isotherms of nitrogen absorption at 77° K of such PPO films, of the amorphous PPO film (Film d), and of a PPO aerogel (Aerogel c) with density equal to about 0.1 g/cm$^3$ and porosity equal to about 90% are illustrated in FIG. 1. The BET surface area values obtained from the data reported in FIG. 1 are summarized in the following Table 1.

TABLE 1

| Specimen | BET Surface area (m$^2$/g) |
| --- | --- |
| Film a | 620 |
| Film b | 510 |
| Aerogel c | 560 |
| Film d | <4 |

The results of table 1 demonstrate the surprising result obtained with the procedure of the present invention, i.e. the obtainment of a film with surface area equal to or greater (for films a and b) than that of an aerogel (Aerogel c) starting from a surface area smaller than 4 m$^2$/g of the amorphous PPO (Film d).

Figure 2:
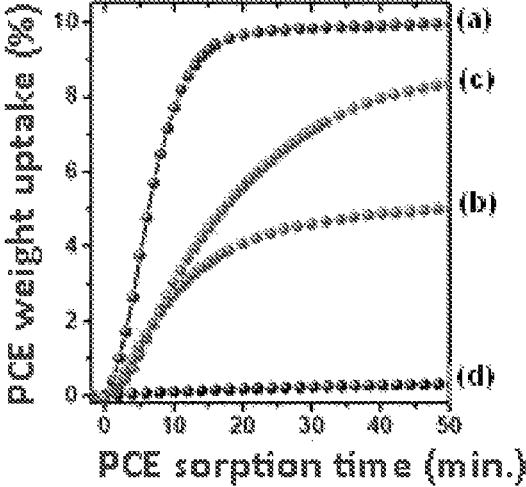
FIG. 2 shows a Cartesian diagram with the kinetics of absorption of perchloroethylene (PCE) at 35° C. and W/W°=0.01 by PPO films with thickness of about 20 μm (a, b, d) and by a PPO aerogel with porosity equal to about 90% (c) as described in example 1.
Figure 3:
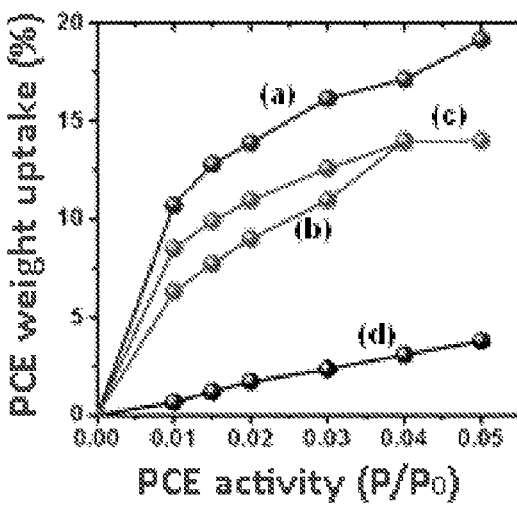

For the same specimens, the kinetics of absorption of perchloroethylene (PCE) at 35° C. for W/Wo=0.01 and the sum of PCE absorbed after 12 hours with various activities (W/Wo≤0.05) are respectively shown in FIGS. 2 and 3.

The quantity of PCE absorbed by the crystalline nanoporous films (Films a and b) has proven to be much higher than that of the amorphous PPO film having the same thickness (Film d).

Surprisingly, the absorption of PCE in the crystalline nanoporous PPO film obtained with the procedure 1-3 (Film a), with a greater surface area, was higher and faster than the absorption of PCE in the PPO aerogel (Aerogel c).

FIG. 4 reports the progression of the absorption of PCE at room temperature by aqueous solutions with PCE concentration equal to 50 ppm for specimens of the aforesaid Films a and d and of the Aerogel c.

Also in this case, the crystalline nanoporous PPO film with high surface area (Film a) has an absorption that is much higher and faster than that observed for the amorphous PPO film (Film d), but also with respect to the PPO aerogel (Aerogel c).

Comparison Example 1

A PPO film with thickness of 20 µm with alpha crystalline nanoporous phase was obtained with the same procedure described in steps 1 and 2 of example 1.

The step of extraction of the carvone is conducted before the procedure 3', but after a partial desorption of the carvone at room temperature, i.e. after the carvone content has spontaneously reduced from 80% w/w to 14% w/w.

The analysis of the X-ray diffraction conducted on the resulting PPO film has shown the presence of the diffraction peaks typical of the alpha crystalline nanoporous form, and the differential colorimeter scans detected a crystallinity of about 45%, with a rate higher than 5 percentage points of crystallization per minute, but the measurement of the BET surface area obtained from the values of nitrogen absorption at 77° K detected values lower than 4 m$^2$/g, much lower than the values obtained in the example 1 with the film (b), and comparable to the values obtained with the amorphous PPO (Film d).

Comparison Example 2

A PPO film with thickness of 20 µm with alpha crystalline nanoporous phase was obtained with the same procedure described in the steps 1 and 3' of example 1, while step 2 was conducted with liquid carvacrol at room temperature per 30 minutes, reaching a carvacrol content equal to about 80% w/w.

The percentage of crystallinity reached did not exceed 10%, with a crystallization rate equal to about 0.3 percentage points of crystallization per minute, and the BET surface area was smaller than 4 m$^2$/g.

Example 2

A first PPO film (Film 1) with thickness of 20 µm and alpha crystalline nanoporous phase was obtained by means of a three-step procedure:

Step 1. Deposition of an amorphous PPO film (Film d) on a glass substrate by means of casting process at 60° C., from a chloroform solution with a concentration of PPO equal to 1% by weight.

Step 2. Crystallization in co-crystalline phase by means of immersion in limonene liquid at the temperature of 85° C. for 5 minutes, reaching a content of limonene of about 70% by weight.

Step 3. Total extraction of the limonene by means of carbon dioxide in supercritical conditions (T=40° C., P=250 bar).

A second PPO film (Film 2) with thickness of 20 μm with alpha crystalline nanoporous phase was obtained with the same procedure, except for step 3, substituted with the following step 3'.

Step 3'. Total extraction of the limonene by absorption/desorption of acetonitrile at room temperature.

As for example 1, the X-ray diffraction figures of such films have shown the presence of the diffraction peaks typical of the alpha crystalline nanoporous form. The differential colorimeter scans have demonstrated a crystallinity of about 44%. The measurement of the crystallization rate detected a rate higher than 8 percentage points of crystallization per minute. The BET surface area values of Films 1 and 2, obtained from the data of nitrogen absorption at 77° K as described in example 1, are summarized in the following Table 2.

TABLE 2

| Film | BET Surface area (m²/g) |
|---|---|
| Film 1 | 505 |
| Film 2 | 295 |

A comparison film attained with the same procedure of the film 1, but by conducting step 2 at room temperature, allowed reaching a content of limonene of about 50% w/w and a percentage of crystallinity of 33% with a crystallization rate lower than 0.1 percentage points of crystallization per minute. The BET surface area value obtained for this comparison film was smaller than 4 m²/g.

On the contrary, a film of the invention, attained by using carvacrol with the same procedure of the film 1, has demonstrated results that are substantially equal to those of the film 1.

Example 3

A PPO film with thickness of 100 μm and alpha crystalline nanoporous phase was obtained by means of a three-step procedure:

Step 1. Deposition of an amorphous PPO film (Film d) on a glass substrate by means of casting process at 60° C., from a chloroform solution with a concentration of PPO equal to 1% by weight.

Step 2. Crystallization in co-crystalline phase by means of immersion in liquid carvone at the temperature of 85° C. per 10 minutes, reaching a content of carvone of about 80% by weight.

Step 3. Total extraction of the carvone by absorption/desorption of acetonitrile at room temperature.

As for example 1, the X-ray diffraction figure of such film has shown the presence of the typical diffraction peaks of the alpha crystalline nanoporous form. The differential colorimeter scanning has demonstrated a crystallinity of about 53%. The measurement of the crystallization rate has detected a rate higher than 5 percentage points of crystallization per minute.

The BET surface area value of the resulting film, obtained from the data of nitrogen absorption at 77° K as described in example 1, was equal to 495 m²/g.

A comparison film attained with the same procedure, but by conducting step 2 at room temperature, allowed reaching a carvone content of about 70% w/w and a percentage of crystallinity of 43% with a crystallization rate lower than 0.2 percentage points of crystallization per minute. The BET surface area value made for this comparison film was smaller than 4 m²/g.

Example 4

The absorption capacity of the film (a) obtained in example 1 was evaluated by carrying out five cycles of PCE absorption/desorption conducted at a temperature of 35° C. and values of W/W⁰ activity equal to 0.01.

The results illustrated in FIG. 5 demonstrated that the Film (a) maintains its absorption capacity even after repeated cycles.

Example 5

A PPO film with thickness of 20 μm with alpha crystalline nanoporous phase was obtained with the same procedure described in the steps 1 and 3' of example 1, while step 2 of co-crystallization was carried out by absorption of carvone from vapor phase 90° C. for 1 hour, reaching a carvone content equal to about 65% w/w.

As for example 1, the X-ray diffraction figure of such film has shown the presence of the diffraction peaks typical of the alpha crystalline nanoporous form. The differential colorimeter scanning has demonstrated a crystallinity of about 36%. The measurement of the crystallization rate detected a rate higher than 0.5 percentage points of crystallization per minute.

The BET surface area value of the resulting film, obtained from the data of nitrogen absorption at 77° K as described in example 1, was equal to about 160 m²/g.

Example 6

A PPO film with thickness of 100 μm and alpha crystalline nanoporous phase was obtained by means of a three-step procedure similar to that of example 1, with the following conditions:

Step 1. Formation of an amorphous PPO film (Film d) on a glass substrate by means of a process of forming from melted PPO via compression at the temperature of 280° C.

Step 2. Crystallization in co-crystalline phase by means of immersion in carvone liquid at a temperature of 100° C. for 5 minutes, reaching a carvone content of about 80% by weight.

Step 3. Total extraction of the carvone by absorption/desorption of acetonitrile at room temperature.

As for example 1, the X-ray diffraction figure of such film has shown the presence of the diffraction peaks typical of the alpha crystalline nanoporous form. The differential colorimeter scanning has demonstrated a crystallinity of about 46%. The measurement of the crystallization rate detected a rate higher than 9 percentage points of crystallization per minute.

The BET surface area value of the resulting film, obtained from the data of nitrogen absorption at 77° K as described in example 1, was equal to about 520 m²/g.

Example 7

A film of a mixture of PPO and atactic polystyrene (PS) in a weight ratio equal to 70/30 with thickness of 20 μm and alpha crystalline nanoporous phase was obtained by means of a three-step procedure similar to that of example 1, with the following conditions:

Step 1. Formation of a PPO/PS amorphous film on a glass substrate by means of a casting process at 60° C., from a chloroform solution with a concentration of the PPO/PS mixture equal to 1% by weight.

Step 2. Crystallization in co-crystalline phase by means of immersion in carvone liquid at room temperature for 16 minutes, reaching a content of carvone of about 80% by weight.

Step 3. Total extraction of the carvone by absorption/desorption of acetonitrile at room temperature.

As for example 1, the X-ray diffraction figure of such film has shown the presence of the typical diffraction peaks of the alpha crystalline nanoporous form. The differential colorimeter scanning has demonstrated a crystallinity of about 30%. The measurement of the crystallization rate detected a rate higher than 1 percentage point of crystallization per minute.

The BET surface area value of the resulting film, obtained from the data of nitrogen absorption at 77° K as described in example 1, was equal to about 325 m²/g.

Example 8

A PPO film with thickness of 100 μm and alpha crystalline nanoporous phase was obtained by means of the same procedure of example 7. The BET surface area value of the resulting film, obtained for the nitrogen absorption data at 77° K as described in example 1, was equal to about 500 m²/g.

The invention claimed is:

1. A procedure for preparing a polyphenylene oxide (PPO) film with crystalline nanoporous phases, comprising:
preparing an amorphous PPO film,
forming co-crystalline phases with a percentage of crystallinity higher than 10% by absorption of host molecules,
forming crystalline nanoporous phases by total removal of said host molecules,
wherein
said absorption of host molecules is conducted up to a host molecule content equal to or greater than 20% w/w,
said forming co-crystalline phases occurs with a crystallization rate equal to or greater than 0.5 percentage points per minute, and
said total removal of said host molecules occurs before the content of said host molecules has dropped below 20% w/w.

2. The procedure according to claim 1, wherein said host molecules have a molecular volume greater than 0.25 nm³.

3. The procedure according to claim 1, wherein said host molecules are molecules of an organic compound selected from the group consisting of carvone, limonene, dibenzyl ether, eugenol, carvacrol, methyl benzoate and mixtures thereof.

4. The procedure according to claim 1, wherein said forming co-crystalline phase takes place at a temperature equal to or higher than 20° C.

5. The procedure according to claim 1, wherein said preparing an amorphous film of PPO is carried out by melt casting and subsequent cooling or by solution casting and subsequent evaporation of the solvent.

6. The procedure according to claim 1, wherein said PPO amorphous film is a self-supporting film or a coating of a substrate.

7. The procedure according to claim 1, wherein said total removal of said host molecules takes place by absorption followed by desorption of host molecules of a volatile liquid compound, preferably selected from the group that comprises, or consists of, acetonitrile, acetone, methyl ethyl ketone and methanol.

8. The procedure according to claim 1, wherein said total removal of said host molecules takes place by supercritical $CO_2$ extraction.

9. The procedure according to claim 1, wherein said total removal of said host molecules takes place before the content of said host molecules has dropped below 30% w/w.

10. A polyphenylene oxide (PPO) film with crystalline nanoporous phases and with surface area equal to or greater than 30 m²/g.

11. The film according to claim 10, wherein said surface area is equal to or greater than 100 m²/g.

12. The film according to claim 10, wherein said crystalline nanoporous phases have a percentage of crystallinity higher than 20%.

13. The film according to claim 10, wherein said polyphenylene oxide film is a self-supporting film or is a coating of a substrate.

14. The film according to claim 13, wherein said substrate is made with a material selected from the group that comprises polymers, ceramics, glass, graphite, quartz, silicon and mixtures thereof.

15. A device for molecular separation, molecular sensing and removal of organic pollutants comprising a polyphenylene oxide (PPO) film according to claim 10.

16. The procedure according to claim 1, wherein said total removal of said host molecules takes place before the content of said host molecules has dropped below 40% w/w.

17. The procedure according to claim 1, wherein said total removal of said host molecules takes place before the content of said host molecules has dropped below 50% w/w.

18. The film according to claim 10, wherein said surface area is equal to or greater than 200 m²/g.

19. The film according to claim 10, wherein said surface area is equal to or greater than 300 m²/g.

20. The film according to claim 10, wherein said crystalline nanoporous phases have a percentage of crystallinity higher than 30%.

* * * * *